United States Patent [19]

Bousaid et al.

[11] 4,085,799
[45] Apr. 25, 1978

[54] OIL RECOVERY PROCESS BY IN SITU EMULSIFICATION

[75] Inventors: Issam S. Bousaid; Alfred Brown; Thomas W. Norman, all of Houston, Tex.

[73] Assignee: Texaco Inc., New York, N.Y.

[21] Appl. No.: 742,922

[22] Filed: Nov. 18, 1976

[51] Int. Cl.$^2$ .................... E21B 43/22; E21B 43/24
[52] U.S. Cl. .................... 166/272; 166/270; 166/273; 166/274; 166/302
[58] Field of Search ............... 166/270, 272, 273, 274, 166/300, 302, 303

[56] References Cited

U.S. PATENT DOCUMENTS

| | | | |
|---|---|---|---|
| 2,218,306 | 10/1940 | Austerman | 166/300 |
| 2,288,857 | 7/1942 | Subkow | 166/272 X |
| 2,672,201 | 3/1954 | Lorenz | 166/300 X |
| 2,799,342 | 7/1957 | Fatt | 166/300 X |
| 3,298,436 | 1/1967 | McCardell | 166/270 |
| 3,326,287 | 6/1967 | Corrin | 166/273 |
| 3,342,265 | 9/1967 | Willard et al. | 166/300 |
| 3,648,771 | 3/1972 | Kelly et al. | 166/272 |
| 3,796,266 | 3/1974 | Carlin et al. | 166/273 X |
| 3,811,504 | 5/1974 | Flournoy et al. | 166/273 |
| 4,007,791 | 2/1977 | Johnson | 166/272 X |

FOREIGN PATENT DOCUMENTS

| | | | |
|---|---|---|---|
| 933,343 | 9/1973 | Canada | 166/272 |

*Primary Examiner*—Stephen J. Novosad
*Assistant Examiner*—George A. Suchfield
*Attorney, Agent, or Firm*—Carl G. Ries; Thomas H. Whaley; Jack H. Park

[57] ABSTRACT

Petroleum may be recovered from subterranean, petroleum-containing formations by injecting into the formation an organic liquid having dispersed therein, an alkali metal in very fine, preferably colloidal size range, particular form. The organic liquid containing the alkali metal dispersion is followed by injecting an aqueous fluid to react with the alkali metal, generating alkali metal hydroxide, hydrogen gas and heat in the formation which stimulates displacement of the petroleum by encouraging formation of low viscosity oil-in-water emulsions, as well as by thermal viscosity reduction effects, and dissolution of hydrogen gas in the viscous petroleum. The organic liquid having alkali metal dispersed therein may be preceded or followed by injecting crude petroleum from another formation which is prone to emulsify spontaneously and aid in the formation of low viscosity oil-in-water emulsions. Liquids containing emulsifying agents may also be used in combination with the present process, injected either in advance of or after injection of the organic liquid having alkali metal particles dispersed therein. Alkali metals suitable for use in this invention include sodium, potassium and lithium. This process may be used in combination with thermal stimulation processes including steam and/or hot water injection.

24 Claims, No Drawings

OIL RECOVERY PROCESS BY IN SITU EMULSIFICATION

BACKGROUND OF THE INVENTION

1. Field of the Invention

The present invention concerns a method for recovering petroleum including viscous petroleum from subterranean, petroleum-containing formations. More particularly, this invention is concerned with a method for recovering petroleum involving the injection of an organic liquid having alkali metal particles dispersed therein for reaction with water in the formation to generate heat, alkali metal hydroxides and hydrogen gas.

2. Description of the Prior Art

There are many known petroleum-containing formations from which very little petroleum can be obtained by normal production techniques because the petroleum viscosity is so high that the petroleum will not flow at formation conditions even if a substantial pressure differential, either natural or artificially induced as by injecting water or other fluids into the formation, is applied to the petroleum. These petroleum formations are sometimes referred to as heavy oil formations, and for the purpose of this disclosure, by heavy oil or viscous petroleum it is meant crude petroleum having an API gravity less than about 25° API at 75° F.

Various techniques have been described in prior art for stimulating the recovery of viscous petroleum or heavy oil, most of which may be categorized either as solvent or miscible flooding, thermal oil recovery methods, or emulsion methods, as well as combinations of the foregoing. Thermal oil recovery methods include steam or hot water injection, or in situ combustion. Solvent or miscible methods involve injecting a solvent for the petroleum into the formation, which solvent may be gaseous or liquid or may have both liquid and gaseous components. Emulsion methods involve treating the formation with aqueous fluids which cause or aid in the formation of an oil-in-water emulsion whose viscosity is significantly lower than the viscosity of the crude petroleum present in the formation at formation conditions. Steam flooding and emulsification methods are sometimes used in a combination process especially in recovering extremely viscous petroleum such as that found in tar sand deposits.

While the foregoing methods have found some commercial success in recovering viscous oil under ideal conditions, there are problems associated therewith which make them inapplicable or uneconomical for many viscous oil formations. Thermal oil recovery methods are becoming increasingly difficult to operate economically because of the increasing cost of natural gas or other fuel utilized to heat the fluid prior to injecting it into the formation. Solvent methods are similarly adversely affected by the high cost of hydrocarbon solvent materials suitable for use in miscible flooding operations.

In U.S. Pat. No. 2,672,201 there is disclosed a method of treating a production well to stimulate the production of petroleum therefrom applicable to the wells which have experienced plugging due to the deposition of solid or immobile hydrocarbon deposits in the formation flow channels immediately adjacent the production wells by injecting a nonaqueous, preferably hydrocarbon liquid and sodium pellets having diameters less than the inside diameter of the production tubing, to react with water in the well bore to generate heat, thereby liquifying and facilitating removal of the flow channel plugging deposits from the vicinity of the production well. In preferred embodiments, the sodium pellets are coated with a plastic resin which is slowly dissolved by water, thereby extending the time of the remedial treatment.

In view of the foregoing discussion, it can be readily appreciated that there is a substantial, unfulfilled need for an economic method of recovering petroleum from subterranean deposits.

SUMMARY OF THE INVENTION

We have discovered an oil recovery method especially useful in recovering petroleum including viscous petroleum from subterranean petroliferous formations which involves injecting into the formation an organic liquid having dispersed therein alkali metal particles whose particle sizes are less than the dimensions of the flow channels and the subterranean, permeable formation, generally in the range of 1–20 microns. The particles are non reactive with the organic liquid and flow readily into the formation. After the predetermined quantity of liquid is injected, injection of water or an aqueous solution is thereafter initiated to displace the previously injected organic liquid through the formation. As the alkali metal particles contact water in the formation or that injected thereinto after the organic liquid injection is completed, alkali metal reacts with water to form alkali metal hydroxides and hydrogen gas, which substantially increases the efficiency and rate of displacement and production of petroleum subterranean formations. Suitable alkali metals include sodium, potassium and lithium. Suitable organic liquids for suspending same include $C_6$ and higher molecular weight aliphatic or aromatic hydrocarbons. Kerosine, naphtha gasoline, and other commonly available commercial mixtures of hydrocarbon solvents are quite suitable for this purpose. Suitable organic liquids also include hydrocarbon ether, petroleum ether, mineral spirits, naphthalene, etc. as well as mixtures of the foregoing solvents. Small amounts of dispersing aids such as lecithin, dimer acids, copper oleate, lead naphthalates, oleic acid, zinc stearate or carbon black are incorporated in the dispersion of alkali metal in organic liquid to achieve the desired small particle sizes. If the crude oil in the formation is prone to emulsify spontaneously upon contacting water and alkali metal hydroxides, an oil-in-water emulsion is formed on contact with the alkali metal hydroxide formed in our process, the viscosity of the emulsion being substantially less than the viscosity of the crude petroleum. In those formations containing crude which is not prone to emulsify spontaneously upon contacting alkali metal hydroxides, it is sometimes desirable to inject into the formation a substance which will enhance the formation of emulsions. Crude petroleum which is known to emulsify in this fashion is a suitable material and can be injected in advance of, after, or blended with the organic liquid having alkali metal particles dispersed therein. Fluids having emulsifiers such as sulfonic acids, organic acids, or petroleum sulfonates may also be utilized alone or in combination with the emulsification-prone crude oil to stimulate formation of low viscosity oil-in-water emulsions.

DESCRIPTION OF THE PREFERRED EMBODIMENTS

Briefly, our process involves an enhanced oil recovery method especially applicable to, but not necessarily limited to, the recovery of viscous petroleum from subterranean, viscous petroleum-containing formations. An organic liquid having dispersed alkali metal of very fine particle size dispersed therein, is used in our process. Any organic liquid which is liquid at formation and ambient conditions may be utilized. Hydrocarbons in the range of from about $C_6$ to about $C_{20}$, either aliphatic or aromatic or a mixture thereof may be utilized for this purpose. Commonly available hydrocarbon liquids such as kerosine, naphtha, natural gasoline or crude petroleum, etc., which are readily available and have a variety of normally liquid hydrocarbon species are very satisfactory for this purpose.

The alkali metal which is dispersed and suspended in the organic liquid may be sodium, potassium, or lithium, or mixtures of these metals may be utilized. It is imperative that the particle size of the alkali metal be sufficiently small so the particles will pass freely through the injection well equipment and through at least major flow channels of the subterranean, permeable, oil-containing formation. This can be accomplished in a number of ways. Grinding of the particles of the alkaline metal to form the desired very fine particle size is satisfatory and since the alkaline metals are quite soft, it is easily accomplished. Another method involves dispersing relatively larger size particles of the alkali metal and organic liquid, heating the liquid and pumping it through high shear pumps for a period of time sufficient to break down the particle size of the alkali metal and form the desired easily pumpable fluid with alkali metal particles dispersed and suspended therein. The commercial sodium dispersion in mineral spirits used in the experimental tests described below was prepared using high velocity tangential shear mixing at a temperature of 110°–115° C, which is above the melting point of sodium (97.5° C) and below the boiling point of the organic liquid in which the sodium is dispersed. High shear mixing at a temperature above the melting point of the alkali metal (but below the boiling point of the organic liquid) is a preferred method of forming the alkali metal dispersion, and is especially preferred for forming dispersions with alkali metal average particle size in the lower part of the desired 1–20 micron range. Dispersing aids are advantageously employed in the dispersions to achieve the desired fineness of particle size. From 0.1 to 1.5 percent of any of the following materials may be used: dimer acid, copper oleate, aluminum tristearate, calcium stearate, lecithin, lead naphthenate, carbon black, or zinc stearate. The preferred dispersing aid for any particular application is determined by the organic liquid used. For example, lecithin is useful with mineral spirits having a boiling range of 170°–195° C; oleic acid is useful with kerosene boiling at 182°–271° C and calcium stearate or aluminum laurate is preferred for use with naphtha boiling in the 144°–163° C range. All of the foregoing information is derived from U.S. Industrial Chemical Company catalog on sodium dispersions.

It should be recognized that the minimum particle size of alkali metal varies with the permeability of the formation into which injected. Low permeability formations require dispersions of alkali metal in the lower part of the stated particle size range. Generally, the particle size should be less than about 20 microns (0.02 millimeters) and preferably in the colloidal size range of about 1 micron.

Materials may be incorporated in the nonaqeous fluid to increase the suspending characteristic of the nonaqueous fluid. For example, oil soluble or hydrophobic polymeric materials may be added to the hydrocarbon or other nonaqueous liquid to increase the viscosity sufficiently that the alkali metal particles will remain suspended therein for long periods of time. Colloidal silica which is naturally hydrophobic, may be utilized in the nonaqueous carrier liquid for the same purpose.

Generally, the weight concentration of alkali metal particles in the organic liquid will be in the range of from about 10 to about 60 percent or higher by weight, and preferably from 35 to 50 percent by weight. Generally, there is no disadvantage in having higher concentrations of alkali metal in the organic liquid carrier medium since the principal purpose of the carrier medium is to ensure that the alkali metals are transported into the formation pore spaces where they can later react with water for the purpose of generating heat, alkali metal hydroxides and hydrogen, all of which increase the displacement efficiency and rate of production of viscous petroleum from the formation.

The quantity of organic liquid having the alkali metal dispersed therein required for a particular formation is ideally expressed in terms of a percentage or fraction of the pore volume of the portion of the formation to be swept by the injected fluid. This is a commonly utilized petroleum engineering parameter and given any field well pattern, the area to be swept by an injected fluid can be estimated with acceptable accuracy using known petroleum engineering techniques. Knowing the area swept and the thickness of the formation, one can easily determine the pore volume in terms of cubic feet or other volume measurements to be contacted by the injected fluid. The quantity of nonaqueous fluid to be injected into the formation according to the process of our invention should be from about 0.5 to about 50 and preferably from about 1.0 to about 10.0 pore volume percent based on the total pore volume of the formation to be swept as determined according to the foregoing discussion.

Since it is desired to inject the alkali metal suspended or dispersed in the organic liquid into the formation and to displace it into the formation before contact between the alkali metal and water occurs (which causes the reaction described above), it is preferable to precede the organic liquid containing the alkali metal with a small slug of organic liquid which contains no alkali metal in order to effectively displace any water remaining in the injection well bore or formation such as from a previously applied water flooding operation, in order to prevent rapid reaction between the injected alkali metal and formation water. It is preferred that this isolation slug be from 0.05 to 5.0 pore volume percent.

Since the principal objective of this preflush treatment is to prevent contact between water and the alkali metal in and near the injection well bore, it is sufficient if the volume of alkali metal-free organic liquid slug be at least twice the injection well bore volume. Optimum results are achieved in using the process of our invention if the reaction between water and the alkali metal occurs slowly such as by migration or diffusion of water through the organic liquid to contact the alkali metal. The reaction between the alkali metal particles and water then occurs at the surface of the alkali metal particles, releasing hydrogen, alkali metal hydroxides which dissolve in the water, and generating substantial thermal energy and an oil-water emulsion bank in the pore spaces of the formation, all of which aid in the reduction of the viscosity of the viscous petroleum in the formation, and thus make possible the production thereof from the formation.

In order to reduce the tendency for the subsequently applied water injection to react immediately with the dispersed alkali metal, it is usually preferable to follow the organic liquid having alkali metal particles dispersed therein with a nonaqueous fluid, e.g., another small slug of the same organic liquid carrier as was used for the dispersed alkali metal particles, or a different nonaqueous fluid, to isolate the alkali metal from the subsequently injected water which is utilized to displace the primary fluid through the formation. From 0.05 to 5.0 pore volume percent is adequate for this slug. Reaction between water and the alkali metal will still occur, although at a slower, more controlled rate as a consequence of diffusion and migration of injected drive water or connate water present in the flow channels through the organic carrier liquid to contact the alkali metal particles.

Many crude petroleums tend to emulsify spontaneously forming low viscosity, oil-in-water emulsions immediately upon being contacted with water and alkali metal hydroxides such as sodium hydroxide, potassium hydroxide, or lithium hydroxide. When such petroleum is contained in the formation to which the process of our invention is applied, simply injecting the organic liquid having alkali metal particles dispersed therein into the formation is adequate to spontaneously emulsify the crude oil present in the formation, thereby accomplishing the desired recovery of oil from the formation. When the crude oil present in the formation does not readily form low viscosity oil-in-water emulsions upon being contacted with water containing alkali metal hydroxides, it is preferred to supplement the foregoing process with additional treatments to encourage the formation of the desired low viscosity oil-in-water emulsion. In one embodiment according to this objective, a slug of crude oil from a different formation which is known to be spontaneously emulsified upon contacting water having dissolved therein alkali metal hydroxides may be injected into the formation, either in advance of, following, or simultaneously with the organic liquid alkali metal dispersion. In this embodiment, a slug, preferably from about 1.0 to about 10.0 pore volume percent based on the total pore volume of the formation to be contacted by the injected fluid, is injected in advance of the alkali metal dispersion. The injected emulsifiable crude will mix with the crude present in the formation, thus forming a mixture which is readily emulsified by the subsequently injected fluids. In an alternate embodiment, the emulsifiable crude is blended with the organic carrier liquid so a single slug of liquid comprising the liquid organic carrier, alkali metal particles and the spontaneously emulsifiable crude oil from another formation are injected into the formation, followed by water injection to accomplish the desired reactions and emulsification of the crude oil present in the formation. If it is desired to mix the extraneous crude petroleum with the hydrocarbon carrier liquid, the volume ratio of crude to carrier liquids can be from about .1 to about 1.0.

In another, related embodiment, either an aqueous or organic liquid having dissolved therein a surface active agent which promotes emulsification of petroleum to form low viscosity, oil-in-water emulsions, may be injected into the formation, before or after the alkali metal dispersion. For example, a 1.0 to about 10.0 pore volume percent slug of liquid containing from 1 to 5 percent by weight of any one of the following emulsifiers may be injected into the formation prior to the nonaqueous liquid and alkali metals: petroleum sulfonates along or in combination with a nonionic surfactant such as an ethylene oxide adduct of an alkanol or alkylphenol, or with an alkyl (or alkylaryl)polyethoxy sulfate, or an alkyl (or alkylaryl) polyethoxyalkyl sulfonate.

Since it is often necessary to heat the organic liquid to achieve the desired fineness of alkali metal particles dispersed therein, it is preferred that the alkali metal dispersion be injected at an elevated temperature to avoid particles coalesing. In low permeability formations it is preferred that the alkali metal dispersion be injected at a temperature above the melting point of the alkali metal particles in the dispersion, but below the boiling point of the organic liquid. Preheating of the injection wellbore and the formation immediately therearound is recommended.

The alkali metal dispersion is preferably followed by a viscous fluid, e.g., water containing from 100 to 1000 parts per million hydrophilic polymer such as polyacrylamide or polysaccharide to achieve a favorable mobility ratio required for good displacement efficiency.

Field water injection is begun after the foregoing slugs have been injected to displace all of these slugs and oil displaced thereby through the formation to the production well.

In a slightly different embodiment of the process of our invention, especially suitable for use in viscous oil formations, a hot fluid such as steam or hot water is injected in advance of and/or after the alkali metal dispersion to enhance emulsification of viscous crudes.

During the course of injecting the primary fluid i.e., the organic liquid and dispersed alkali metal, a number of reactions occur as the fluid passes through the subterranean permeable formation. Water, either from the flow channels or that which is injected before or after the primary fluid, diffuses and penetrates into the organic liquid and makes contact with the alkali metal particles. Water and sodium, for example, reacts rapidly upon contact to form sodium hydroxide and hydrogen gas. The reaction is exothermic, and the heat generated as a consequence of this reaction is believed to be one of the factors which promotes enhanced oil recovery in our process. The alkali metal hydroxide, e.g. sodium hydroxide, lithium hydroxide or potassium hydroxide, is highly soluble in water, and a solution of the alkali metal hydroxide is an effective emulsifier either alone or in combination with previously or simultaneously injected emulsifiers as described above. Conversion of viscous petroleum in the formation to a low viscosity oil-in-water emulsion is a very effective method for stimulating displacement and recovery of viscous petroleum from the subterranean formation.

The hydrogen liberated by the above reaction is also believed to play a significant role in the reaction, although its role is not thoroughly understood. Small gas bubbles are formed and dispersed throughout the continuous liquid phase, which may under certain conditions generate a stable, viscous foam which aids in efficiently displacing petroleum and/or emulsions thereof through the formation. Generation of hydrogen also increases the pressure in the flow channels of the formation, which supplies additional drive energy to displace petroleum toward a remotely located production well. Hydrogen may also contact petroleum in advance of the point where emulsification is occurrring, and dissolution of hydrogen in viscous petroleum swells petroleum and reduces its viscosity, which facilitates displacement and emulsification. Finally, it is possible that some hydrogenation of the crude oil in the formation may occur, depending on the temperature of the formation and the susceptability of the crude oil to hydrogenation. Hydrogenation of petroleum reduces its viscosity in the formation thereby aiding in the displacement and recovery of viscous petroleum.

It is important to realize that liberation of hydrogen in liquid-filled flow channels will result in a substantial increase in the pressure in those flow channels. While this is helpful in aiding the displacement of petroleum in the direction of the production well, the injection pressure must be maintained at a value greater than the localized pressure generated in the flow channels in order to prevent backflowing or the flow of liquids from the point where hydrogen generation is occurring in the direction of the injection well. Thus, it will generally be necessary to increase the pressure at which water is injected into the formation significantly after completion of the organic liquid alkali metal dispersion injection step in order to maintain the positive pressure gradient from the injection well to the production well. One effective means for maintaining the water injection pressure sufficient to prevent backflow of fluids into the injection well is to install flow rate monitoring devices in the injection well which quickly detect significant drops in flow rates and especially note reversals in flow direction. The injection pressure is increased as necessary to prevent such fluid flow reversals in the injection well. Ordinarily, backflow will be prevented if the injection pressure is increased after completion of the organic liquid alkali metal dispersion injection phase has been completed. We have found that a value of from about 50 to about 100 percent greater than the pressure required to inject the organic liquid and alkali metal into the oil saturated core was adequate for this purpose in laboratory tests. Backflow may also be avoided by shutting in the injection well manually or by action of check valves.

EXPERIMENTAL SECTION

For the purpose of demonstrating the operability of the process of our invention, and further to illustrate the magnitude of the results obtained from application thereof, the results of following experimental work is presented.

An alundum core encased in an epoxy sleeve and mounted in a displacement mechanism which permits the injection of fluid thereinto under pressure was utilized for the experiment. The core was first saturated with brine and then oil saturated using a 20.6° API, crude oil whose viscosity at 77° F was 70 centipoise, to obtain an initial oil saturation in the range of about 60 to about 78 percent. The core was then water flooded at an injection pressure of about 60 pounds per square inch until the water cut reached a value of about 99 percent, which usually was obtained after from 2 to 3 pore volumes of water had been injected into the core. The data from six runs are contained in the following Table.

TABLE

| | Oil Recoveries Using Nonaqueous Liquid And Dispersed Alkali Metals | | | | | |
|---|---|---|---|---|---|---|
| Run | 1 | 2 | 3 | 4 | 5 | 6 |
| Fluid Injected | Kerosene | Crude Oil | Crude Oil | Crude Oil | Crude Oil | Crude Oil |
| Volume | 3.1 cc | 3.0 cc | 3.0 cc | 3.0 cc | 3.0 cc | 3.0 cc |
| Alkali Metal | None | Sodium | None | Sodium | Sodium | NaOH |
| Volume Mineral Spirits + 50% By Weight Alkali Metal | None | 0.5 cc | None | 0.5 cc | 0.5 cc | 1.0 cc |
| Residual Oil Saturation After Waterflood | 24.2 | 19.2 | 32.5 | 32.5 | 24.4 | 27.2 |
| Residual Oil Saturation After Injecting Sodium Dispersion | 21.9 | 6.3 | 32.5 | 23.2 | 11.3 | 24.2 |
| Final Percent Oil Recovery | 63.6 | 89.5 | 54.5 | 67.5 | 85.5 | 66.7 |

Various types of slugs were injected into the core, all of which were followed by water flooding. In Run 1, a 3cc sample of kerosene was injected into the core, which corresponds to about 0.1 pore volume. No alkali metal was dispersed in the kerosene and the ultimate oil recovery was 63% and residual oil saturation was 21.9 percent, compared to 24.2 percent after waterflood.

In all of the runs in which sodium dispersed in mineral spirits was utilized, a commercially available dispersion prepared and sold by U.S. Industrial Chemical Company was utilized which was 50 percent sodium by weight in mineral spirits. A 0.5 milliliter slug of the liquid was utilized in the experiments in which sodium was injected into the cores. The oil injected into the cores in tests 2–6 was the same 20.6° API crude oil as was used in obtaining the initial oil saturation in the core, and was injected in two parts. Approximately 2 cc's was injected prior to injection of the mixture of mineral spirits and metalic sodium and approximately 1 cc was injected thereafter in order to separate the slug of sodium dispersion from the subsequently injected water and to insure that the water-sodium reaction occurred in the core and not in the injection lines.

Runs 2 and 3 are essentially identical except no sodium was used in Run 3 whereas ½ cc of sodium and mineral spirits was utilized in Run 2. It can be seen that significant additional oil was recovered by virtue of injecting the ½ cc of mineral spirits and sodium in Run 2 as compared to Run 3. The oil saturation after conclusion of the sodium recovery process in Run 2 was 6.3% compared to 32.5% for Run 3. A total of 89 percent of the oil originally in the core was recovered after waterflooding and application of the sodium dispersion slug process of our invention. The oil saturation after water flooding was 19.2 percent for run 2 and was reduced to 6.3 percent by our process. Run 3 was identical to run 2 except no sodium dispersion was used, and it can be seen that the residual oil saturation after waterflooding was not reduced at all by injecting the oil slug, as expected. Run 4 was a continuation of run 3, and as can be seen by the change in oil saturation from 32.5 to 23.2 percent, some oil recovery was accomplished. The lower final percent oil recovery (compared to run 2) is believed to be due to a redistribution in oil saturation caused by the run 3 procedure.

Run 5 was essentially a repeat of run 2 except a higher value of oil saturation after water flooding had been obtained. Significantly the reduction in percent oil saturation resulting from injecting the sodium slug dispersion was 13.1 for run 5 and 12.9 for run 2, which is considered to be excellent agreement.

In all of the floods in which the mineral spirits and alkali metal fluids were injected into the core, once water flooding was resumed at the same injection pressure the injection rate in the core decreased rapidly and finally reached 0. After a period of about two hours with no flow, and with 100 psi pressure maintained, water began to flow more readily into the core at the same injection pressure, indicating the reaction had proceded sufficiently far to achieve the desired emulsification and viscosity reduction effect. Oil production with relatively little water production was noted, indicating good oil banking was occurring in the core. Once water breakthrough occurred at the production end of the core, an oil-in-water emulsion was produced for a significant period of time. Water injection was continued again until about a 99% water cut was reached.

Since the effect of the reaction between alkali metal and water in the core is the formation of sodium hydroxide, Run 6 was performed to demonstrate the relative effect of this portion of the reaction occurring in the core, since sodium hydroxide was injected into the core in combination with the crude oil, rather than injecting the liquid mineral spirits and metallic sodium. The sodium hydroxide was formed by mixing 0.5 cc. of the sodium dispersion with water and injecting it into the core to maintain all conditions as consistent as possible between run 6 and run 5. It can be seen that the reduction in residual oil saturation achieved in run 6 was only 3.0 percent, not as great as that obtained by application of the process of our invention in which metallic sodium dispersed in the mineral spirits liquid was injected, and the final oil recovery was not as great as that obtained utilizing the process of our invention. This clearly shows that while some additional oil may be recovered after conclusion of water flooding by injecting both a quantity of hydrocarbon solvent and sodium hydroxide to promote emulsification, the magnitude of the additional oil recovery is not as great as that which can be obtained by the process of our invention which not only generates alkali metal hydroxide to promote emulsification, but also generates hydrogen gas and a significant amount of heat in the flow channels as a consequence of the exothermic reaction occurring when water and an alkali metal such as sodium are brought into contact.

Thus we have disclosed and demonstrated how significant additional oil above that obtainable by water flooding may be recovered from an oil formation by injection thereinto a slug of an organic liquid having dispersed therein fine particulate alkali metal such as sodium, potassium or lithium, which reacts with water present in the formation or injected thereinto later to form alkali metal hydroxides, hydrogen gas and to generate significant heat in the pore spaces of the formation, all of which stimulate production of oil from the formation.

While our invention is described in terms of a number of illustrative embodiments, it is not so limited since many variations thereof will be apparent to persons skilled in the art of oil recovery without departing from the true spirit and scope of our invention. Similarly, while mechanisms have been described to explain the results obtained from application of the process of our invention, it is not necessarily to be implied from such explanation that these are the only or even the principal mechanisms occurring in the formation as a consequence of the application of the process steps described herein above and claimed herein below, and we do no wish to be bound by any particular theory of operation of the process of our invention. It is our desire and intention that our invention be limited and restricted only by those limitations and restrictions which appear in the claims appended hereinafter below.

We claim:

1. A method for recovering oil from a subterranean, oil containing, permeable formation penetrated by at least one injection well and by at least one spaced apart prodution well, both wells being in fluid communication with the formation, comprising:
   (a) injecting into the formation via the injection well an organic liquid which is liquid at formation conditions, having dispersed therein alkali metal particles, the size of the alkali metal particles being less than the size of the major flow channels of the formation; and
   (b) injecting water into the formation to displace the organic liquid alkali metal dispersion through the formation to react with water in the formation forming alkali metal hydroxide, hydrogen and generating heat; and
   (c) recovering oil displaced by the fluids of steps (a) and (b) from the formation via the production well.

2. A method as recited in claim 1 wherein the alkali metal particles are in the colloidal size range.

3. A method as recited in claim 2 wherein the size range of the alkali metal particles is from about 1 to about 2 microns.

4. A method as recited in claim 1 wherein the alkali metal is chosen from the group consisting of sodium, potassium, lithium and mixtures thereof.

5. A method as recited in claim 4 wherein the alkali metal is sodium.

6. A method as recited in claim 4 wherein the alkali metal is potassium.

7. A method as recited in claim 4 wherein the alkali metal is lithium.

8. A method as recited in claim 1 wherein the organic liquid is a $C_6$ to $C_{20}$ hydrocarbon including mixtures thereof.

9. A method as recited in claim 1 wherein the organic liquid of (a) is selected from the group consisting of kerosene, naphtha, natural gasoline, crude oil, petroleum ether, mineral spirits, and mixtures thereof.

10. A method as recited in claim 1 wherein the concentration of alkali metal in the organic liquid is from about 10 to about 80 percent by weight.

11. A method as recited in claim 1 wherein the concentration of alkali metal in the organic liquid is from 35 to 50 percent by weight.

12. A method as recited in claim 1 wherein the volume of organic liquid alkali metal dispersion injected into the formation is from about 1 to about 10 pore volume percent based on the volume of formation to be swept by the injected fluids.

13. A method as recited in claim 1 comprising the additional step of injecting into the formation prior to the injection of the nonaqueous liquid having alkali metal particles dispersed therein, from about 0.05 to about 5.0 pore volume percent of an organic liquid.

14. A method as recited in claim 1 comprising the additional step of injecting into the formation immediately after injection of the organic liquid with alkali metal particles dispersed therein, from about 0.05 to about 5.0 pore volume percent of an organic liquid, to isolate the organic liquid containing alkali metal of (a) from the water injected according to (b).

15. A method as recited in claim 1 comprising the additional step of injecting into the formation a crude oil which is readily emulsified upon being contacted with water having dissolved therein alkali metal hydroxide, prior to step (a).

16. A method as recited in claim 1 comprising the additional step of injecting into the formation a slug of an aqueous liquid having dissolved therein an emulsifying surface active agent, prior to step (a).

17. A method as recited in claim 16 wherein the emulsifying surface active agent is selected from the group consisting of ethylene oxide adducts of alkanols or alkyl phenols, alkyl (or alkylaryl) polyethoxy sulfates, alkyl (or alkylaryl) polyethoxyalkyl sulfonates, and mixtures thereof.

18. A method as recited in claim 1 comprising the additional step of injecting a heated fluid comprising steam, hot water or a mixture thereof, into the formation prior to injecting the alkali metal dispersion.

19. A method as recited in claim 1 comprising the additional step of injecting a heated fluid comprising steam, hot water of a mixture thereof into the formation after injection of the alkali metal dispersion.

20. A method as recited in claim 1 wherein the dispersion of alkali metal in organic liquid is heated to a temperature greater than the melting point of the alkali metal and less than the boiling point of the organic liquid.

21. A method as recited in claim 1 wherein the alkali metal dispersion in the organic liquid also contains a dispersing aid selected from the group consisting of dimer acids, copper oleate, aluminum tristearate, carbon black, lecithin, calcium stearate, zinc stearate, lead naphthenate and mixtures thereof.

22. A method as recited in claim 1 wherein the organic liquid of step (a) has mixed therewith a crude oil which is readily emulsified upon being contacted with water having dissolved therein alkali metal hydroxide.

23. A method as recited in claim 1 comprising the additional step of injecting into the formation a crude oil which is readily emulsified upon being contacted with water having dissolved therein alkali metal hydroxide, between step (a) and step (b).

24. A method as recited in claim 1 comprising the additional step of injecting into the formation a slug of an aqueous liquid having dissolved therein an emulsifying surface active agent, between steps (a) and (b).

* * * * *

UNITED STATES PATENT AND TRADEMARK OFFICE
CERTIFICATE OF CORRECTION

PATENT NO. : 4,085,799

DATED : April 25, 1978

INVENTOR(S) : Issam S. Bousaid, et al.

It is certified that error appears in the above-identified patent and that said Letters Patent is hereby corrected as shown below:

Claim 3, Col. 10, Line 36 delete "2" and substitute therefor --20--

Signed and Sealed this

Fifth Day of June 1984

[SEAL]

Attest:

GERALD J. MOSSINGHOFF

Attesting Officer          Commissioner of Patents and Trademarks